J. SEBASTIAN.
Draft-Equalizer.
No. 203,380.  Patented May 7, 1878.
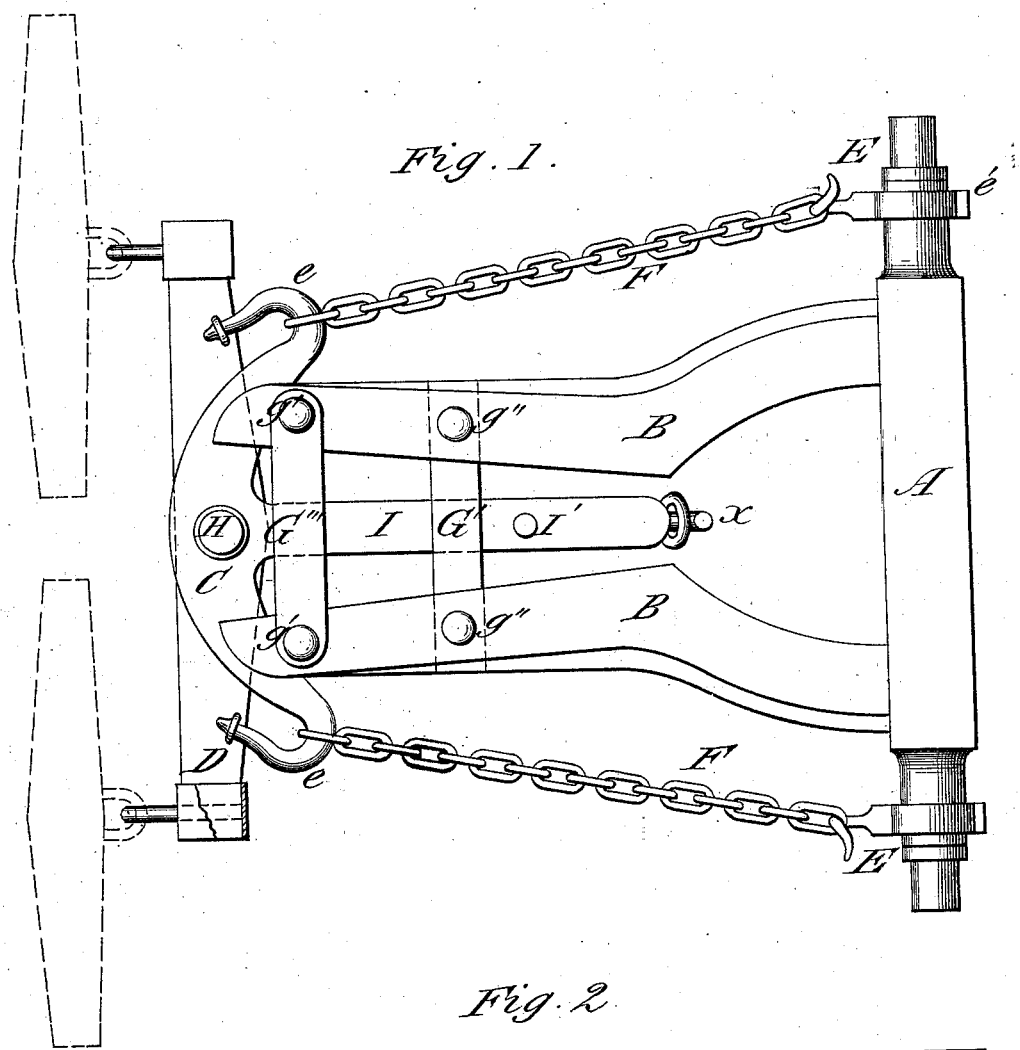
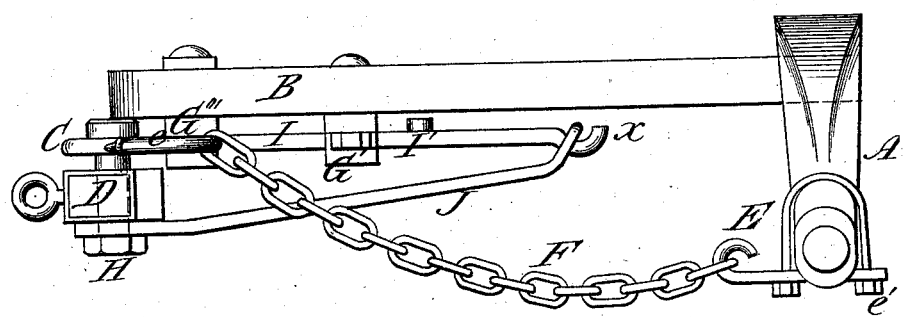

UNITED STATES PATENT OFFICE.

JACOB SEBASTIAN, OF NEW YORK, N. Y.

IMPROVEMENT IN DRAFT-EQUALIZERS.

Specification forming part of Letters Patent No. 203,380, dated May 7, 1878; application filed February 13, 1878.

*To all whom it may concern:*

Be it known that I, JACOB SEBASTIAN, of the city, county, and State of New York, have invented a new and Improved Draft-Equalizer, which is fully set forth in the following specification and accompanying drawings, in which latter—

Figure 1 is a plan or top view of an apparatus embodying my improvements, and Fig. 2 is a side view thereof.

Similar letters designate corresponding parts.

The object of my invention is to equalize the draft on a team of horses or other animals, and to prevent the wagon-pole from striking the team whenever either of the front wheels meets with an obstruction or sinks into a cavity or hole.

Heretofore wagons and their draft apparatus have been commonly constructed so that, when either of the forward wheels met an obstruction, the tongue or pole was swung around, and generally struck one of the horses on the shoulder, often seriously injuring the animal.

Again, when the wheels met an obstruction, such obstruction overcame the momentum of the wagon, and thereby occasioned violent shocks to the animals, often causing sore shoulders, and thus rendering the animals temporarily useless, besides causing them great pain.

To obviate these evil consequences, I construct a draft-equalizer as will be shown hereinafter.

In the accompanying drawings, A represents the forward axle. B represents the hounds. C represents a sliding draft-bar with arms $e$ $e$ and hooked ends. D represents the main whiffletree. E E represent hooks attached to the axle A, for receiving chains F, connecting said axle to the draft-bar. In lieu of these chains, rods may be used, if preferable. $G^I$ $G^{II}$ represent slotted cross-pieces or guides, holding the hounds rigidly by the aid of bolts $g^I$ $g^I$ and $g^{II}$ $g^{II}$, and receiving and supporting the shank I of the sliding draft-bar C. H represents a bolt by which the main whiffletree is attached to the drawing-bar. $I^I$ represents a bolt or pin fastened into the sliding bar, and serves as a stop, by means of which the draft-bar is prevented from escaping. (See Fig. 2.) J represents a whiffletree-bolt keeper, by means of which the main whiffletree-bolt is steadied, and which is provided with an eye at the rear end, into which passes the hooked or upturned end of the shank I of the draft-bar, and thereby forms the rear end of the bar.

In practice I construct the cross-pieces $G^I$ $G^{II}$ in such a manner that the shank of the draft-bar has room to play from one side to another for the following purpose: When one of the front wheels meets an obstruction the strain is equally divided by reason of the drawing rod or chain being tightened and the free play allowed the draft-bar in the slot of the cross-pieces.

It will be seen that by this arrangement the pole or tongue has no possible chance of being thrown from one side to another, and that the strain necessary to overcome the obstruction is equally divided between the animals.

It is obvious that the slotted cross-pieces $G^I$ $G^{II}$ are placed on the under side of the hounds B, thus serving three purposes: first, as guides for the draft-bar; second, as braces for the hounds; third, as rests for the end of the tongue.

The letter $G^{III}$ represents a strap, which is placed across the upper surface of the hounds B B, and serves to hold them rigidly together, and also prevents the tongue from working out of place, it being inserted between the hounds.

As will be seen, the draft-bar C is provided with arms on either side, shaped preferably like a swan's neck, to facilitate the working and unhooking of the draft chains or rods F F, made preferably of forged wrought-iron, on account of its great strength, and constructed so that when the wagon is started the strain is directly on the axle.

Heretofore the whiffletree was attached to the hounds by means of a bolt, thus leaving the wood-work to bear the strain.

The clip cross-pieces, by means of which the axle is attached to the bed-piece, are provided at one end with a hook to receive the chain or rod, and thus facilitate the unhooking of the same.

What I claim as new, and desire to secure by Letters Patent, is—

1. The combination of a draft-bar, C, with one or more cross-pieces, $G^I$ $G^{II}$, provided with slots to receive the shank I of the draft-bar C, the said cross-pieces being attached to the hounds B B, substantially as specified.

2. The combination, in a draft-equalizer, of the whiffletree D, the bolt H, the slotted cross-pieces $G^I$ $G^{II}$, the draft-bar C, the draft-chains F F, the hooked cross-pieces E E, the whiffle-tree-bolt keeper J, attached to the hounds, substantially as herein set forth.

JACOB SEBASTIAN.

Witnesses:
 RUDOLPH F. EILENBERG,
 GEORGE WURST, Jr.